UNITED STATES PATENT OFFICE.

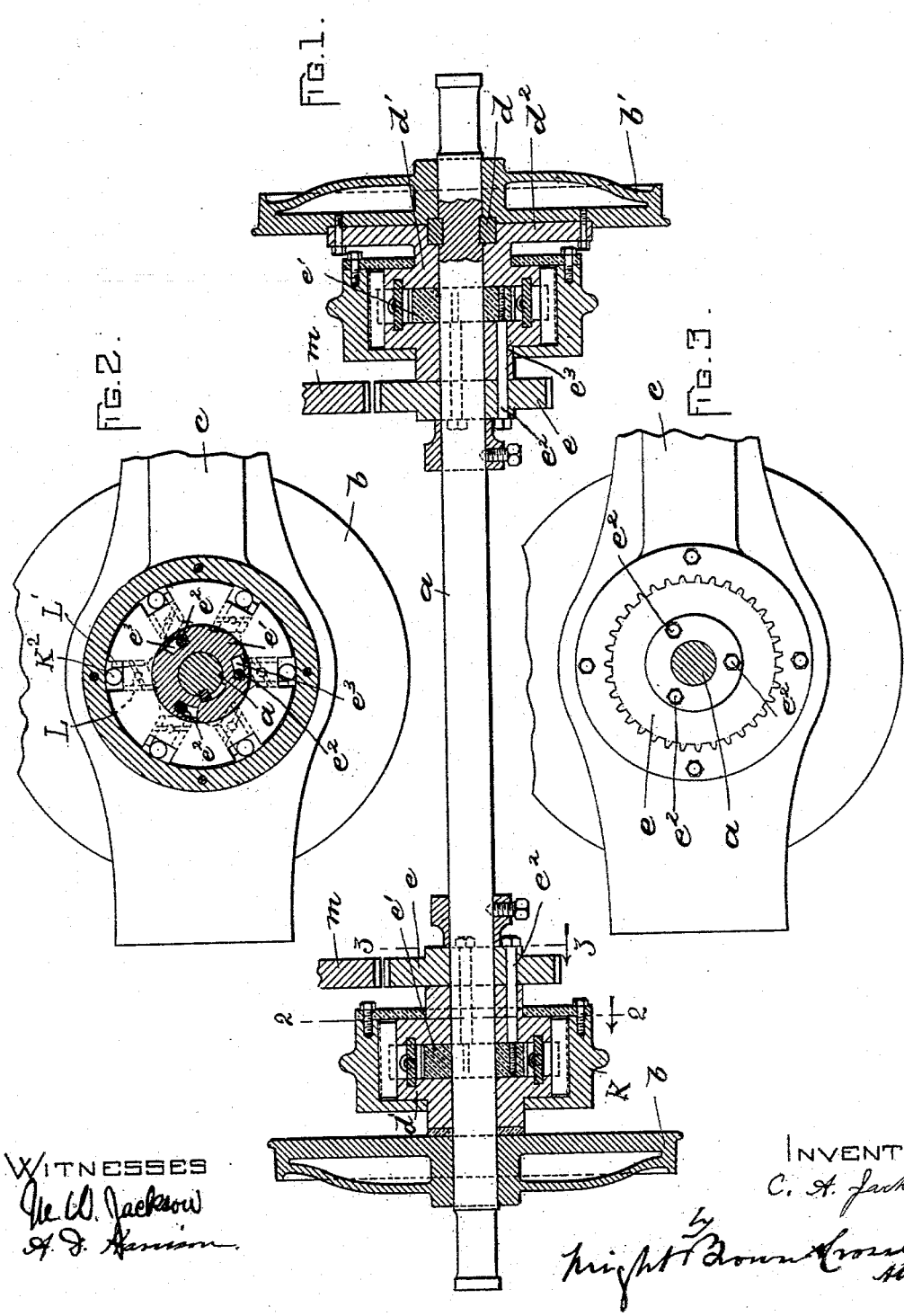

CHARLES ALMON JACKSON, OF READING, MASSACHUSETTS.

RUNNING-GEAR FOR ELECTRIC CARS.

SPECIFICATION forming part of Letters Patent No. 533,598, dated February 5, 1895.

Application filed September 15, 1893. Serial No. 485,558. (No model.)

*To all whom it may concern:*

Be it known that I, CHARLES ALMON JACKSON, of Reading, in the county of Middlesex and State of Massachusetts, have invented certain new and useful Improvements in Running-Gear for Electric Cars, of which the following is a specification.

This invention relates to certain improvements in running gear of street railway cars operated by the style of electric motor shown and described in Patent No. 487,329, granted to me December 6, 1892, the object being to simplify the construction and render it more practical.

To the above ends the invention consists in certain novel features of construction and combinations of parts hereinafter described and claimed.

The invention is illustrated in the accompanying drawings, in which—

Figure 1 shows a sectional view of wheels and driving means mounted on an axle. Fig. 2 shows a section on line 2—2 of Fig. 1. Fig. 3 shows a section on line 3—3 of Fig. 1.

A complete showing of the motor applied to a car is not here entered into but only sufficient illustration is given to connect the present invention with the former structure, reference being had to the patent referred to for a full understanding of the motor. A brief enumeration of parts of the former structure here shown will suffice.

The letter $a$ designates an axle of a car to which the motor is applied, and $b\ b'$ the wheels mounted on said axle.

The letter, $d'$, designates the clutch-blocks which are fixed with respect to the wheels, and each of which embraces an internal ring, $e'$, capable of limited rotary movement on the shaft and formed with peripheral cam-surfaces to act on the buttresses, L and L', which are carried by an oscillatory bar and may be reversed by movement of the ring, $e'$, so that either may stand in the path of the clutch-roller, K'. Levers, $c$, pivoted on the axle have boxes, K, embracing the clutch-blocks and in contact with the clutch-rollers, and these levers are oscillated by the motor through suitable connections.

The wheel $b'$ is mounted on the axle as follows: A ring $d$ is sweated on the axle, and the wheel and the clutch block $d'$ each has a recess to fit over one half of the said ring. The wheel is fitted on the axle on one side of the ring and shoved up tight against the same, and the block $d'$ is fitted on the axle on the opposite side of the ring and the said block has a flange $d^2$, which is bolted to the wheel.

The wheel, $b'$, runs loose on the axle, whereas the wheel, $b$, is affixed thereto, and while one wheel is driven the other is idle. Hence in going around curves the differences in extent of track-rails are compensated for and sliding of the wheels is prevented.

Gear-wheels, $e$, loosely mounted on the axle are employed to reverse the direction in which the wheels are driven, said gear-wheels being actuated by bars, $m$, as described in my former patent above referred to.

Each gear wheel $e$ instead of being connected with the interior ring $e'$ by a lever as formerly, is fitted up against the clutch block and connected with the ring by long bolts, $e^2$ extending through curved slots $e^3$ in the block.

It will be seen that my construction for supporting the loose wheel prevents the entrance of dust into the bearing.

Having thus described the invention, what I claim as new, and desire to secure by Letters Patent, is—

1. The combination of the axle having a ring affixed thereto, a wheel having a recess to receive one half of said ring, and a clutch-block having a recess to receive the other half of the ring, and a flange bolted to the wheel.

2. The combination of the clutch-block having slots, the internal ring, the gear-wheel connected with said ring by bolts extending through the slots in the block and means for actuating said gear.

In testimony whereof I have signed my name to this specification, in the presence of two subscribing witnesses, this 12th day of September, A. D. 1893.

CHARLES ALMON JACKSON.

Witnesses:
M. W. JACKSON,
A. D. HARRISON.